Aug. 21, 1951  F. A. LANE  2,564,982
OSCILLATOR DRIVE MECHANISM
Filed Aug. 15, 1947  2 Sheets-Sheet 1
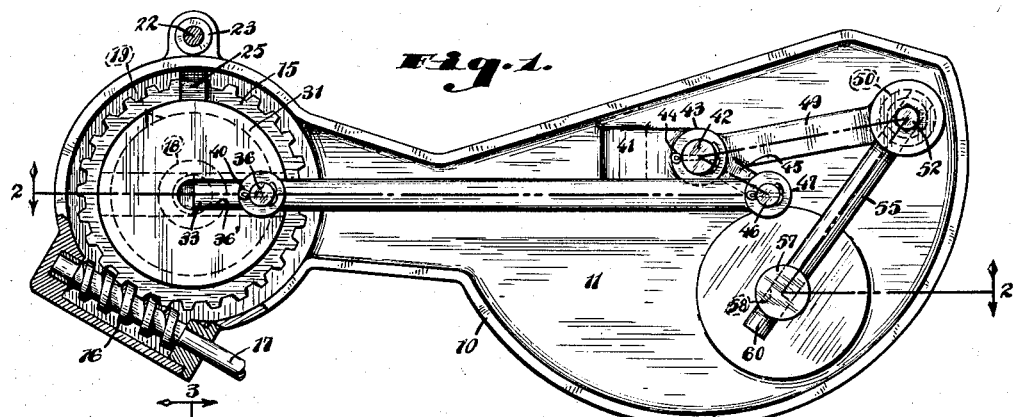
Fig. 1.
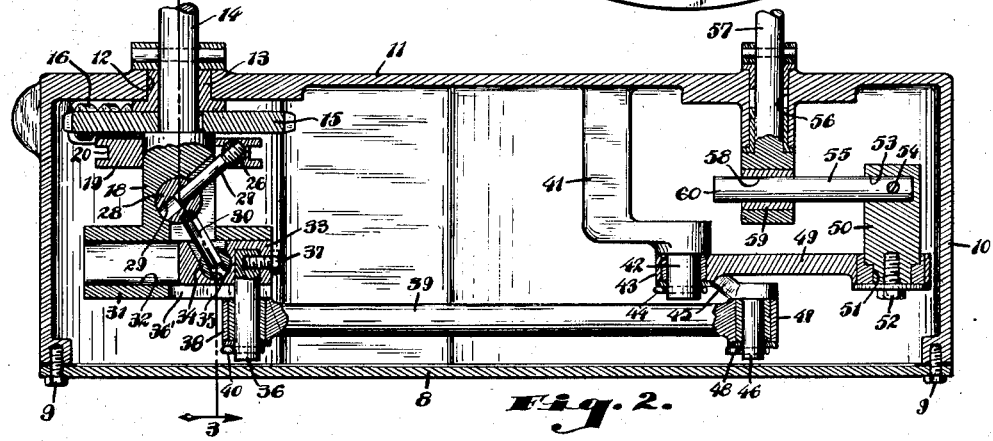
Fig. 2.
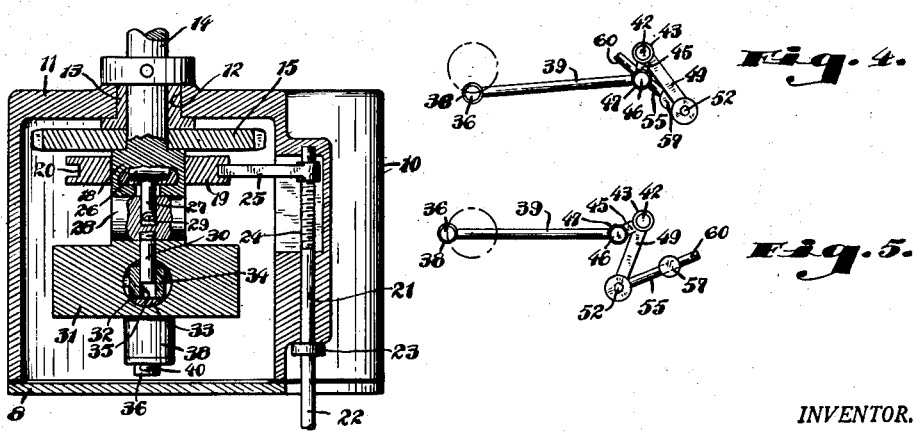
Fig. 3.
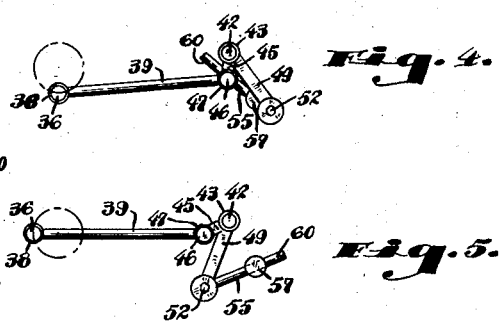
Fig. 4.
Fig. 5.
INVENTOR.
FRED A. LANE,
BY:
Harold B. Hood.
ATTORNEY.

Aug. 21, 1951   F. A. LANE   2,564,982
OSCILLATOR DRIVE MECHANISM
Filed Aug. 15, 1947   2 Sheets-Sheet 2

INVENTOR.
FRED A. LANE,
BY: Harold B. Hood
ATTORNEY.

Patented Aug. 21, 1951

2,564,982

UNITED STATES PATENT OFFICE 2,564,982

OSCILLATOR DRIVE MECHANISM

Fred A. Lane, Shelburn, Ind., assignor to Lane Motors, Incorporated, Terre Haute, Ind., a corporation of Indiana Application August 15, 1947, Serial No. 768,803

18 Claims. (Cl. 74—75)

The present invention relates to an oscillator drive mechanism, and is particularly concerned with means for converting continuous rotary motion to oscillatory motion of unusually wide angular magnitude. The primary object of the invention, then, is to provide novel mechanism establishing a driving connection between a unidirectional rotor and an element to be oscillated about a fixed axis, the drive train being of such character as to be capable of swinging the oscillator through an arc substantially in excess of 180° as a result of continuous rotation of the rotor.

A further object of the invention is to provide extremely simple drive-connection mechanism capable of accomplishing the above-outlined result, such mechanism being unusually sturdy and consisting solely of levers and swivels, without the inclusion of toothed gears.

A further object of the invention is to provide means whereby the angular extent of the oscillatory stroke of the driver element may be varied by a simple adjustment. A still further object of the invention is to make such adjusting means of such character as to be actuable during operation of the motion converter.

Additional objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a bottom plan view of a housing enclosing one embodiment of my invention, the cover plate having been removed therefrom;

Fig. 2 is a longitudinal section through the mechanism illustrated in Fig. 1, taken substantially upon the planes indicated by the section line 2—2 in Fig. 1;

Fig. 3 is a substantially vertical section taken substantially upon the planes indicated by the section line 3—3 in Fig. 2;

Figs. 4 and 5 are diagrammatic bottom plan views, upon a reduced scale, of the drive train of Fig. 1 in various positions assumed during the cycle of operation;

Figure 6:
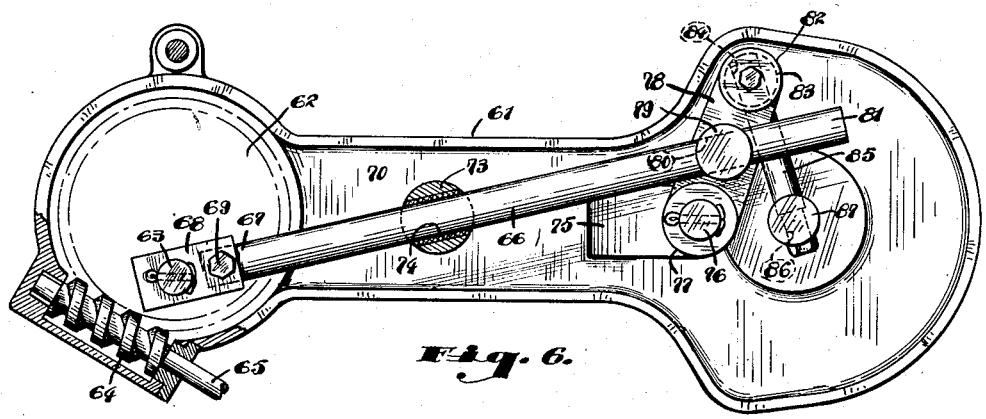
Fig. 6 is a view similar to Fig. 1 but showing a modified embodiment of my invention.
Figure 7:
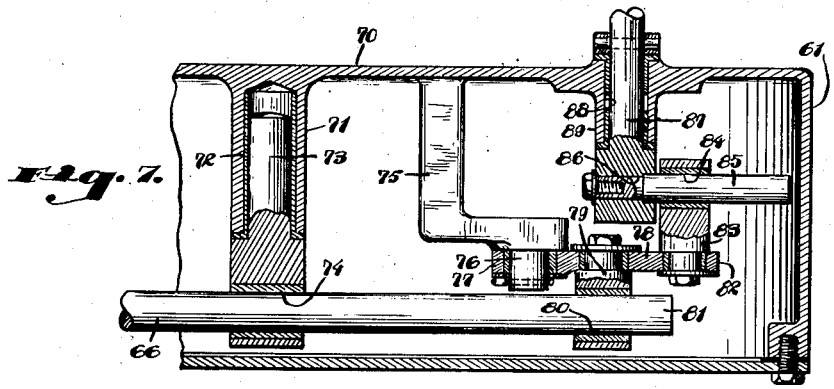
Fig. 7 is a fragmental, longitudinal sectional view of the output end of the drive train of Fig. 6.
Figure 8:
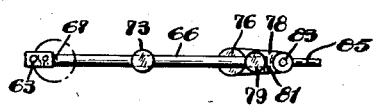
Figs. 8 and 9 are diagrammatic plans of the drive train of Fig. 6 in various positions assumed during the cycle of operation thereof.
Figure 9:
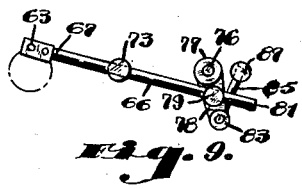

Referring more particularly to Figs. 1 to 5 inclusive, it will be seen that I have illustrated a housing 10 formed with an integral top wall 11 and an open bottom adapted to be closed by a cover plate 8 suitably secured to the housing 10 by machine screws 9, or the like, with an intervening gasket, if desired, to make the housing liquid-tight, whereby the parts to be described may, if desired, run immersed in lubricant.

An opening 12 in the housing wall 11 may mount a bushing or bearing 13 in which is journalled a shaft 14 carrying, within the housing, a worm gear 15 with which meshes a worm 16 on a power input shaft 17 suitably journalled in the housing and driven by any desired power means.

Within the housing 10, the shaft 14 carries or is provided with, a cylindrical stem 18 upon which is mounted a ring 19, rotationally fixed to said stem, but capable of sliding axial movement relative thereto. The ring 19 is formed with an outwardly opening peripheral groove 20. Suitably journalled in a bore 21 in the housing, upon an axis parallel with the axis of the shaft 14, is an adjusting shaft 22 carrying a stop collar 23 and having a threaded section 24 upon which is threadedly mounted a yoke 25 whose oppositely projecting arcuate fingers are operatively received in the groove 20 of the ring 19. It will be obvious, particularly from an inspection of Fig. 3, that rotational adjustment of the shaft 22 in opposite directions will shift the ring 19 axially oppositely relative to the stem 18.

A rocker 26 is socketed in the ring 19 upon an axis tangential to a circle concentric with the shaft 14, and a pin 27 projects radially from said rocker. The structure, as clearly illustrated in Figs. 2 and 3, permits oscillation of the rocker 26 and pin 27 in a plane including the axis of the shaft 14 and stem 18. A second rocker 28 is socketed in the stem 18 upon an axis parallel with the axis of the rocker 26 and perpendicularly intersecting the axis of the stem 18. Said rocker 28 is formed with a transaxial bore 29 therethrough, slidably receiving the projecting end of the pin 27. Radially projecting from the rocker 28, in the plane of the axis of the pin 27, but angularly related thereto is a pin 30.

The stem 18 carries, at its lower end, a block 31 formed with a guideway 32 which extends transaxially of the stem 18; and a block 33 is reciprocably mounted in said guideway. A rocker 34 is socketed in said block 33 for oscillation upon an axis parallel to the axes of oscillation of the rockers 26 and 28. The rocker 34 is formed with a transaxial bore 35 slidably receiving the projecting end of the pin 30.

It will be readily perceived that, as the ring 19 is moved downwardly from its illustrated position, the rockers 26 and 28 will be turned in a clockwise direction, the pin 27 sliding farther into the bore 29; whereby the pin 30 will be bodily shifted in a clockwise direction, about the axis of the rocker 28, will slide farther into the bore 35, and will bodily shift the block 33 toward the left, concurrently turning the rocker 34 in a clockwise direction in its socket.

The block 33 is socketed to receive a trunnion pin 36 which projects downwardly therefrom, through a slot 36' opening downwardly from the guideway 32, the axis of said trunnion being parallel with the axis of the shaft 14. The parts are so proportioned and designed that, when the ring 19 has been moved downwardly to the limit of its stroke, the axis of the trunnion pin 36 will coincide with the axis of the shaft 14.

The trunnion pin is fixed relative to the block 33 by a machine screw 37, or the like, preferably projecting into a socket suitably formed in said pin. Its downward extension forms a pivotal mounting for one end 38 of a pitman 39. If desired, a bushing may surround the pin 36 in the eye of said pitman end, and the pitman end may be held in place on the trunnion pin by a cotter pin 40, or the like, a washer preferably being interposed between said cotter pin and the pitman end 38.

Depending from the wall 11 of the housing 10 is a bracket 41 providing a trunnion 42 whose axis is parallel with the axis of the shaft 14. Journalled on said trunnion 42 is a bell crank lever 43, held in place by a cotter pin 44, or the like. One short arm 45 of said lever terminates in a trunnion pin 46 providing a journal mounting for the other end 47 of the pitman 39, said pitman end being held in place by a cotter pin 48, or the like. The other arm 49 of said lever 43 is substantially longer than the arm 45, and is acutely angularly related to said arm. The outer end of said arm 49 provides a swivel mounting for a block 50, said block being journalled in an opening 51 in said lever arm 49 and secured therein by means of a washer and machine screw 52, or the like. Near its upper end, the block 50 is formed with a transaxial socket 53 and one end of a pin 55 is secured in said socket by means of a cross pin 54, or the like.

An opening 56 in the wall 11, paraxial with the opening 12, is preferably bushed to receive an oscillator 57 formed, within the housing 10, with a transaxial bore 58 in which is mounted a bushing 59, the end 60 of the pin 55 being slidably received in said bushing.

With the parts in their illustrated positions, the oscillator 57 is at the counterclockwise limit of its stroke, as viewed in Fig. 1. If, now, the worm gear 15 is driven to turn the shaft 14 in a clockwise direction, as viewed in Fig. 1, the end 38 of the pitman 39 will be moved toward the left, whereby the arm 45 of the lever 43 will be moved in a clockwise direction about the axis of the trunnion 42. It will be noted that the axis of said trunnion, while parallel with the axes of the shaft 14 and the oscillator 57 is substantially offset from a line joining said axes. The above-described movement of the arm 45 will, of course, be accompanied by an equal angular movement of the arm 49; but, because of the difference in the lengths of said arms, the block 50 will travel a much longer path than will be travelled by the trunnion 46. Because of the offset between the axes of the elements 42 and 57, the distance between the axes of the block 50 and the element 57 will vary as the lever 43 swings in a clockwise direction. The arm 49 being longer than the lineal distance between the axes of the elements 42 and 57, the block 50 will swing out beyond (though very close to) the element 57, the pin 55 sliding transaxially relative to the element 57 during such movement. In Fig. 4, I have illustrated the positions of the parts after the rotor 19 has been turned through 90° from its position illustrated in Fig. 1; and in Fig. 5, I have illustrated the positions of the parts after 180° of movement of said rotor. It will be readily perceived, from a consideration of the drawings, that the axis of the block 50 twice crosses a line drawn through the axis of the oscillator 57 and normal to a line joining the said axis with the axis of the trunnion 42, during movement of the pin 36 from the position of Fig. 1 to the position of Fig. 5, and twice crosses that line again during movement of the element 36 from its position shown in Fig. 5 to its position shown in Fig. 1. Of course, as the rotor continues in clockwise movement from the position of Fig. 5, the lever 43 reverses its movement and swings, in a counterclockwise direction, back to the position of Fig. 1. When the pin 36 has turned 90° in a clockwise direction from its position of Fig. 5, the parts, other than the pitman 39, will occupy substantially the positions of Fig. 4.

With the parts adjusted as shown in Figs. 1 and 2, rotation of the rotor produces approximately 217° of oscillation of the oscillator 57, in each direction, for each revolution of the rotor.

It will be entirely clear, from a consideration of Figs. 2 and 3, that if the ring 19 is shifted downwardly to the limit of its stroke to bring the axis of the pin 36 into coincidence with the rotor axis, rotation of the rotor will have no effect upon the oscillator assembly. Of course, such adjustment of the pin 36 will, of itself, shift the parts of the drive train substantially to the positions shown in Fig. 4. It will also be clear that incremental adjustment of the ring 19 upwardly from such limiting position will incrementally increase the effect of rotor rotation upon the oscillator assembly until the opposite limiting position, illustrated in the drawings, is reached.

Referring, now, to the embodiment of my invention illustrated in Figs. 6 to 9 inclusive, it will be seen that I have shown a somewhat similar housing 61 in which is journalled a rotor 62 which may be similar, or identical, in construction with the rotor illustrated in Figs. 1 to 5. Said rotor is provided with an eccentrically related trunnion pin 63 and is adapted to be driven by a worm 64 upon a power input shaft 65.

A lever 66 has one end 67 received in a fitting 68, journalled upon the pin 63, means, such as a screw 69, being provided for fixedly securing said lever end to the fitting 68.

Depending from the top wall 70 of the housing 61 is a mounting tube 71 having a bushing 72 therein, in which is journalled a fulcrum element 73. Said element 73 is provided with a transaxial bore 74 in which is slidably received the central portion of the lever 66.

Depending from the wall 70 of the housing is a bracket 75, similar to the bracket 41, and formed to provide a trunnion 76 upon which is journal mounted one end 77 of a lever 78. The axes of the rotor 62, fulcrum element 73, and pin 76 are disposed in a common plane and in mutual parallelism, and the axis of the fulcrum element 73, in the preferred embodiment of my invention is located midway between the axes of the rotor 62 and pin 76.

Intermediate its ends, the lever 78 swivelly carries a downwardly-projecting post 79 formed with a transaxial bore 80 capable of alignment with the bore 74, and the end 81 of the lever 66 is slidably received in said bore 80.

At its outer end 82, the lever 78 swivelly carries an upstanding post 83 formed with a transaxial bore 84 slidably receiving a pin 85 fixed in a transaxial bore 86 in an oscillator element 87 similar to the element 57 and mounted in the bore 88 of a guide tube 89 depending from the wall 70.

It will be seen that, when the pin 63 is in the position illustrated in Fig. 6, the lever 78 is at one end of its oscillatory stroke. If, now, the rotor 62 is turned in a clockwise direction, the lever 66 will be shifted axially toward the left, and concurrently will be swung, in a clockwise direction, about the axis of the fulcrum element 73. Thereby, the post 79 will be forced to move in a clockwise direction about the fixed axis of the trunnion 76; and the resultant movement of the lever 78 will cause the pin 85 to swing in a clockwise direction, thereby turning the oscillator 87. When the pin 63 has reached the position illustrated in Fig. 8, the parts will be in their median positions; and further clockwise movement of the rotor will swing the parts to the positions illustrated in Fig. 9, wherein the lever 78 is at the opposite end of its stroke. It will be perceived that the post 83 has twice crossed a line drawn through the axis of the oscillator 87 and normal to a line joining the axes of the trunnion 76 and the oscillator 87, during movement of the parts from the positions illustrated in Fig. 6 to the positions illustrated in Fig. 9. As the pin 63 completes a full rotation, the parts will be turned again through the positions of Fig. 8 to the positions of Fig. 6.

Obviously, the pin 63 may, if desired, be associated with the rotor 62 through the adjusting mechanism illustrated in Figs. 2 and 3.

I claim as my invention:

1. An oscillator drive mechanism comprising, in combination with an element to be oscillated about a first axis, means providing a journal axis eccentric to said first axis, a lever journalled for oscillation on said journal axis, means including a rod providing an operative connection between an arm of said lever and said element, said rod operatively connecting said lever arm and said element and having a sliding connection, in the direction of its own length, with one of the parts connected thereby, and means to swing said lever arm oscillably past said first axis.

2. The organization of claim 1 in which said last-named means comprises a rotating member, means for driving said rotating member, and means eccentrically connecting another arm of said lever with said rotating member.

3. The organization of claim 1 in which said last-named means comprises a rotating member, means eccentrically associated with said rotating member, and means providing an operative connection between said lever and said eccentrically associated means.

4. The organization of claim 3 in which said eccentrically-associated means is adjustable radially toward and away from the axis of rotation of said rotating member.

5. The organization of claim 4 including means operatively associated with said eccentrically-associated means and shiftable, during rotation of said rotating member, to adjust said eccentrically-associated means toward or away from said axis of rotation.

6. An oscillator drive mechanism comprising an element journal mounted for oscillation about a fixed axis, a rotor journal mounted for rotation about a parallel axis, a lever mounted for oscillation about a third parallel axis spaced from a line joining said first-named axes, a pitman joining a point on said rotor eccentric to the axis thereof with one arm of said lever, and a rod joining the other arm of said lever with said element, said rod having a sliding connection, in the direction of its own axis, with one of the parts joined thereby.

7. The organization of claim 6 in which the first-named arm of said lever is relatively short and the last-named arm thereof is relatively long and arranged at an acute angle to said first-named arm.

8. The organization of claim 6 in which the point of connection of said pitman to said rotor is radially adjustable toward and away from the axis of rotation of said rotor.

9. The organization of claim 6 including means, operable during rotation of said rotor, for shifting the point of connection of said pitman with said rotor toward or away from the axis of rotation of said rotor.

10. An oscillator drive mechanism comprising an element journal mounted for oscillation about a fixed axis, a rotor journal mounted for rotation about a parallel axis, a lever mounted for oscillation about a third parallel axis intersected by a line joining said first-named axes, a fulcrum member mounted for oscillation about a fourth axis parallel with said axes and located between said rotor and said lever axis and intersecting said line, a second lever having one end connected eccentrically to said rotor, supported intermediate its ends upon said fulcrum member for movement in the line of its own axis relative to said fulcrum member, and connected near its opposite end, to said first-named lever through a sliding, swivel connection, and a rod operatively connecting said first-named lever with said element and having a sliding connection with one of its connected parts.

11. The mechanism of claim 10 in which the axis of oscillation of said fulcrum member is midway between the axis of said rotor and the axis of oscillation of said first-named lever.

12. An oscillator drive mechanism comprising an element journal mounted for oscillation about a fixed axis, a rotor journal mounted for rotation about a parallel axis, a lever mounted for oscillation about a third parallel axis, a fulcrum post journal mounted for oscillation about a fourth axis parallel with said axes and having a transaxial bore therethrough, a second lever slidably received in said bore, one end of said second lever being eccentrically connected to said rotor, a post swivelly mounted on said first-named lever intermediate its ends, and formed with a transaxial bore therethrough, the opposite end of said second lever being slidably received in said bore, a second post swivelly mounted on said first-named lever adjacent its free end and formed with a transaxial bore therethrough, and a pin radially projecting from said element and slidably received in said last-named bore.

13. The mechanism of claim 12 in which said fulcrum post axis is midway between said rotor axis and the axis of oscillation of said first-named lever.

14. The mechanism of claim 13 in which the axis of oscillation of said element, the axis of rotation of said rotor, the axis of oscillation of said first-named lever, and the axis of oscillation of said fulcrum post are disposed in a common plane.

15. An oscillator drive mechanism comprising an element journal mounted for oscillation about a fixed axis, a rotor journal mounted for rotation about a parallel axis, a lever mounted for oscillation about a third parallel axis, a member eccentrically connected to said rotor and eccentrically connected to said lever and providing a driving connection between said rotor and said lever, and a rod operatively joining said lever with said element, said rod having a sliding connection, in the direction of its own axis, with one of the parts joined thereby.

16. The organization of claim 15 in which the point of connection of said member with said lever is closer to said third axis than is the point of connection of said rod with said lever.

17. The organization of claim 15 in which the point of connection of said member with said rotor is radially adjustable toward and away from the axis of said rotor.

18. The organization of claim 15 including means, operable during rotation of said rotor, for shifting the point of connection of said member with said rotor toward or away from the axis of rotation of said rotor.

FRED A. LANE.

REFERENCES CITED

The following references are of record in the file of this patent:

UNITED STATES PATENTS

| Number | Name | Date |
|---|---|---|
| 252,176 | Breed | Jan. 10, 1882 |
| 277,025 | Hadley et al. | May 8, 1883 |
| 301,115 | Gowdy | July 1, 1884 |
| 1,796,753 | Greene | Mar. 17, 1931 |
| 2,237,919 | Weid | Apr. 8, 1941 |
| 2,319,485 | Alabrune | May 18, 1943 |